(12) United States Patent
Sako et al.

(10) Patent No.: US 9,438,788 B2
(45) Date of Patent: Sep. 6, 2016

(54) INFORMATION PROCESSING DEVICE AND STORAGE MEDIUM

(71) Applicant: SONY CORPORATION, Tokyo (JP)

(72) Inventors: Yoichiro Sako, Tokyo (JP); Yuan Wei, Tokyo (JP); Akira Tange, Tokyo (JP); Takatoshi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/403,820

(22) PCT Filed: Mar. 26, 2013

(86) PCT No.: PCT/JP2013/058684
§ 371 (c)(1),
(2) Date: Nov. 25, 2014

(87) PCT Pub. No.: WO2013/183338
PCT Pub. Date: Dec. 12, 2013

(65) Prior Publication Data
US 2015/0138396 A1    May 21, 2015

(30) Foreign Application Priority Data
Jun. 7, 2012  (JP) ................................. 2012-129825

(51) Int. Cl.
*H04N 5/232*     (2006.01)

(52) U.S. Cl.
CPC ...... *H04N 5/23216* (2013.01); *H04N 5/23206* (2013.01); *H04N 5/23222* (2013.01); *H04N 5/23293* (2013.01); *H04N 5/23245* (2013.01)

(58) Field of Classification Search
CPC ..................... H04N 5/23216; H04N 5/23222
See application file for complete search history.

(56) References Cited

U.S. PATENT DOCUMENTS 4,974,013 A * 11/1990 Ohsawa ........................ 396/290
5,198,855 A *  3/1993 Iwai ............................... 396/106

FOREIGN PATENT DOCUMENTS

| JP | 2000-092378 A | 3/2000 |
|----|---|---|
| JP | 2005-065079 A | 3/2005 |
| JP | 2005-117190 A | 4/2005 |
| JP | 2005-184610 A | 7/2005 |
| JP | 2006-332809 A | 12/2006 |
| JP | 2007-251974 A | 9/2007 |
| JP | 2008-178147 A | 7/2008 |
| JP | 2009-284322 A | 12/2009 |
| JP | 2010-166515 A | 7/2010 |
| JP | 2010-258672 A | 11/2010 |
| JP | 2011-010273 A | 1/2011 |
| JP | 2011-103548 A | 5/2011 |
| JP | 2011-188318 A | 9/2011 |

* cited by examiner

*Primary Examiner* — James Hannett
(74) *Attorney, Agent, or Firm* — Chip Law Group

(57) ABSTRACT

There is provided an information processing device including a storage control unit that causes shooting parameters to be stored, a change instruction unit that transmits an instruction to change the shooting parameters, and a change processing unit that, in response to the instruction from the change instruction unit, changes the shooting parameters without relying on a surrounding environment. The instruction from the change instruction unit does not indicate content of the change in the shooting parameters, but instructs execution of the change.

16 Claims, 13 Drawing Sheets

INFORMATION PROCESSING DEVICE AND STORAGE MEDIUM

TECHNICAL FIELD

The present disclosure relates to an information processing device and a storage medium.

BACKGROUND ART

Recently, digital cameras and digital video cameras that store and save a subject image as a digital image signal in a storage medium have been spread. In a case where images are shot using such camera, it is necessary to set shooting parameters of the camera appropriately according to a surrounding environment and situation. For example, Patent Literature 1 below proposes an operating lever enabling complex operations to be performed intuitively so as to comfortably switch the configuration of various shooting parameters.

However, it is difficult for general users to manually set appropriate shooting parameters. Accordingly, in general, digital cameras and the like have an auto function by which shooting parameters corresponding to environments are automatically set. For example, the following Patent Literatures 2 through 4 propose imaging devices that automatically set appropriate shooting parameters corresponding to subjects.

In addition, the following Patent Literature 5 proposes a technology of presenting shooting parameters corresponding to a specified subject, and the following Patent Literatures 6 and 7 propose technologies of easily setting shooting conditions corresponding to a preference of a user.

CITATION LIST

Patent Literature

Patent Literature 1: JP 2009-284322A
Patent Literature 2: JP 2005-184610A
Patent Literature 3: JP 2011-103548A
Patent Literature 4: JP 2010-166515A
Patent Literature 5: JP 2011-10273A
Patent Literature 6: JP 2007-251974A
Patent Literature 7: JP 2011-188318A

SUMMARY OF INVENTION

Technical Problem

However, in all of the above technologies, in the case of using an auto function, the various shooting parameters are configured within a fixed range according to the subject and the surrounding environment. For this reason, although photographs that are simple in composition may be accommodated, it has been difficult to accommodate backlight and complex compositions.

For example, when there is backlight, even conducting auto shooting many times may result in poor photos in which all faces are completely darkened or blurry. An experienced user may know that if faces are completely darkened when there is backlight, the photo may be improved by switching to flash photography, but for a general user this judgment is difficult. Moreover, even if a general user is able to make this judgment, the operation of switching to flash photography is burdensome. In addition, although a blurry photo may be improved by raising the shutter speed and the ISO sensitivity, for a general user this judgment is similarly difficult. Moreover, even if a general user is able to make this judgment, the operation of changing the shutter speed and the like is burdensome.

In addition, after switching to flash photography or changing the shutter speed and the like to shoot, the user often goes back to auto shooting, which is doubly burdensome.

In the first place, for backlit photos, such as at sunset or sunrise, and photos of complex composition, it is desirable to accommodate such photos not with shooting parameters within a fixed range configured according to a preconceived scene, but rather to have the user manually configure shooting parameters according to the particular situation. However, as discussed above, for a general user, it has been difficult to judge which shooting parameters should be changed to be able to conduct satisfactory shooting.

Accordingly, the present disclosure proposes a new and improved information processing device and storage medium capable of improving the method of changing shooting parameters.

Solution to Problem

According to the present disclosure, there is provided an information processing device including a storage control unit that causes shooting parameters to be stored, a change instruction unit that transmits an instruction to change the shooting parameters, and a change processing unit that, in response to the instruction from the change instruction unit, changes the shooting parameters without relying on a surrounding environment. The instruction from the change instruction unit does not indicate content of the change in the shooting parameters, but instructs execution of the change.

According to the present disclosure, there is provided a storage medium storing a program that causes a computer to execute a process that causes shooting parameters to be stored, a process that transmits an instruction to change the shooting parameters, and a process that, in response to the instruction by the process that transmits the instruction to change, changes the shooting parameters without relying on a surrounding environment. The instruction by the process that transmits the instruction to change does not indicate content of the change in the shooting parameters, but instructs execution of the change.

Advantageous Effects of Invention

According to the present disclosure as described above, it becomes possible to improve the method of changing shooting parameters.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will proceed in the following order.

1. Overview of shooting parameter changing system according to embodiment of present disclosure
2. Configuration of digital camera
3. Embodiments
3-1. First embodiment
3-2. Second embodiment
3-3. Third embodiment
4. Conclusion <<1. Overview of shooting parameter changing system according to embodiment of Present disclosure>>

Figure 1:
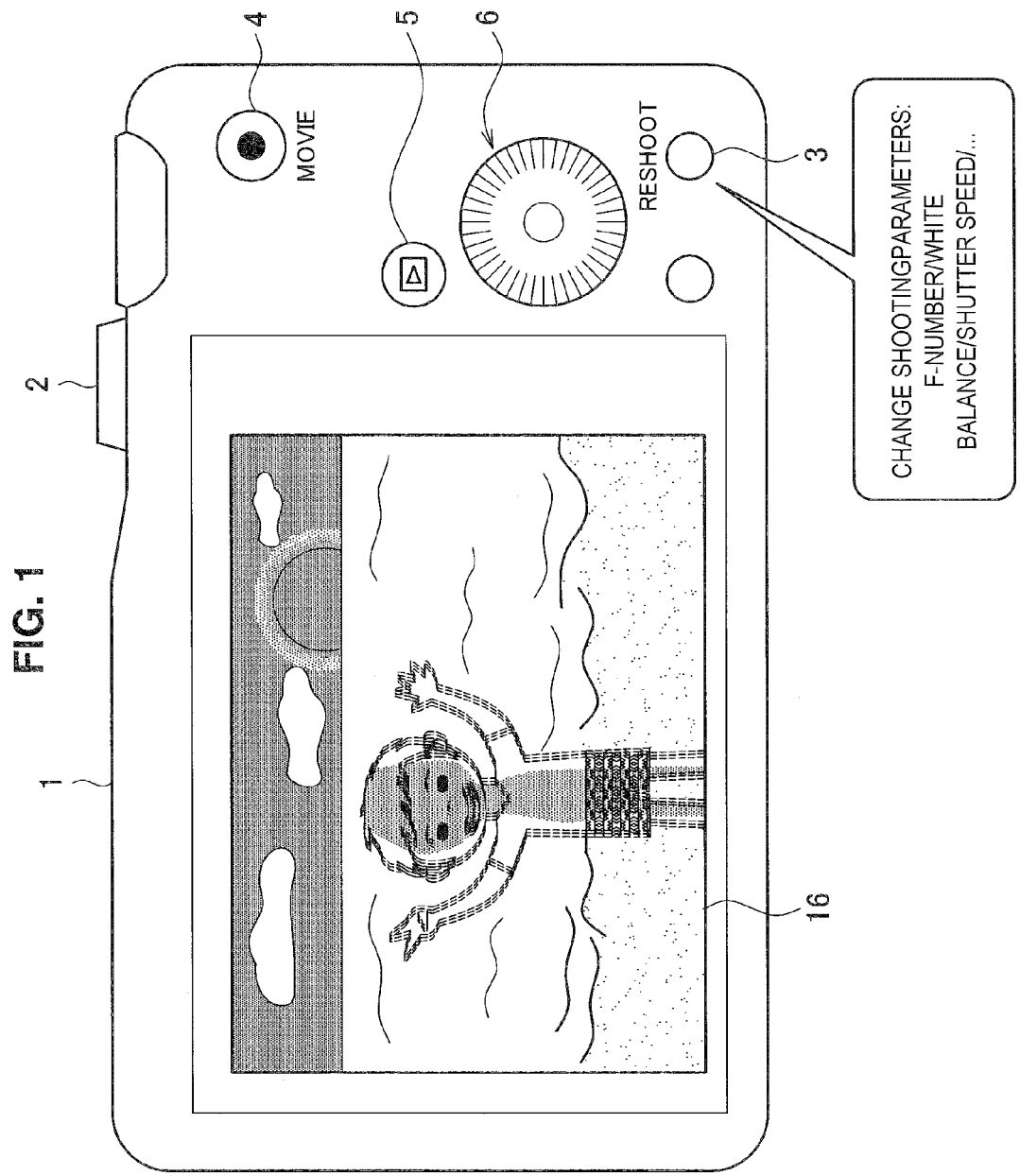
FIG. 1 is a diagram illustrating an overview of a shooting parameter changing system according to an embodiment of the present disclosure.

First, with reference to FIG. 1, an overview of a shooting parameter changing system according to an embodiment of the present disclosure is explained. FIG. 1 is a diagram illustrating an overview of a shooting parameter changing system according to an embodiment of the present disclosure. As shown in FIG. 1, the digital camera 1 according to the present embodiment is provided with a shutter button 2, a reshoot button 3, a MOVIE (moving image) button 4, a playback button 5, a dial 6, and a display unit 16. Furthermore, on a surface opposite the surface where the display unit 16 shown in FIG. 1 is provided, a flash and an imaging lens are provided (not shown).

The digital camera 1 shown in FIG. 1 is capable of switching an operation mode to a still-image shooting mode, a moving-image shooting mode, or a playback mode, for example. In a case of the still-image shooting mode, the digital camera 1 stores, in memory, still-image data (photograph) imaged through the imaging lens in response to a timing when the shutter button 2 is pressed. On the other hand, in a case of the moving-image shooting mode, the digital camera 1 starts to shoot a moving image in response to a timing when the MOVIE button 4 is pressed, and stores moving-image data (video) imaged through the imaging lens in the memory. When the playback button 5 is pressed, the digital camera 1 switches the operation mode to the playback mode, and displays, on the display unit 16, pieces of image data including the still-image data and moving-image data stored in the memory.

In a case of the shooting modes (still image/moving image), a user may manually set respective shooting parameters by operating the dial 6 and the like, or may set the respective shooting parameters by using an auto function. Normally, general users set the respective shooting parameters by using the auto function. Subsequently, as shown in FIG. 1, a shot image is displayed on the display unit 16, and the user can immediately check the shot image.

At this point, for difficult-to-shoot compositions such as backlit compositions and complex compositions, shooting many times using the auto function may result in repeated failure in some cases. For example, as illustrated in FIG. 1, in cases such as when a person's face is darkened because of backlight, and furthermore appears blurry, an experienced user is able to judge improvements such as changing to flash photography, whereas a general user may have difficulty making a judgment. Consequently, a general user conducts auto shooting many times, and repeatedly shoots with the same shooting parameters.

However, with the auto function, shooting parameters are configured within a preconceived fixed range according to environment, and thus it is difficult to accommodate complex compositions, such as a backlit composition as illustrated in FIG. 1. Consequently, if the user conducts auto shooting many times without changing to flash photography, the user will simply fail repeatedly.

Accordingly, with the digital camera 1 according to an embodiment of the present disclosure, if the reshoot button 3 illustrated in FIG. 1 is pressed, for example, the shooting parameters are changed without relying on the surrounding environment, and as a result, suitable shooting parameters may be obtained. Specifically, the shooting parameters are changed on the basis of factors such as the length of time and strength with which the reshoot button 3 is depressed, or a random number, without being limited to a range preconfigured by the above auto function, for example.

Consequently, repeated failure due to conducting auto shooting many times may be prevented, and in addition, the usability of the digital camera 1 increases. Also, by changing the shooting parameters on the basis of a standard not found in the ordinary auto function, such as the length of time and strength with which the reshoot button 3 is depressed, or a random number, it becomes possible to improve the changing method.

Note that, in the present specification, the shooting parameters include ON/OFF of a flash, shutter speed, ISO speed, aperture (f-number), exposure value (EV) shift, exposure mode, white balance, color emphasis, chroma, contrast, sharpness, and the like.

Hereinafter, such a shooting parameter changing system according to the present embodiment is explained using a plurality of embodiments. In addition, the present embodiment shows the digital camera 1 as an example of an information processing device that achieves the shooting parameter changing system. However, the example of the information processing device according to the present disclosure is not limited thereto. For example, the information processing device according to the present embodiment may be a digital video camera, a camera-equipped smartphone, a personal digital assistant (PDA), a personal computer (PC), a cellular phone, a portable music playback device, a portable video processing device, a portable game device, or the like.

<<2. Configuration Of Digital Camera>>

Figure 2:
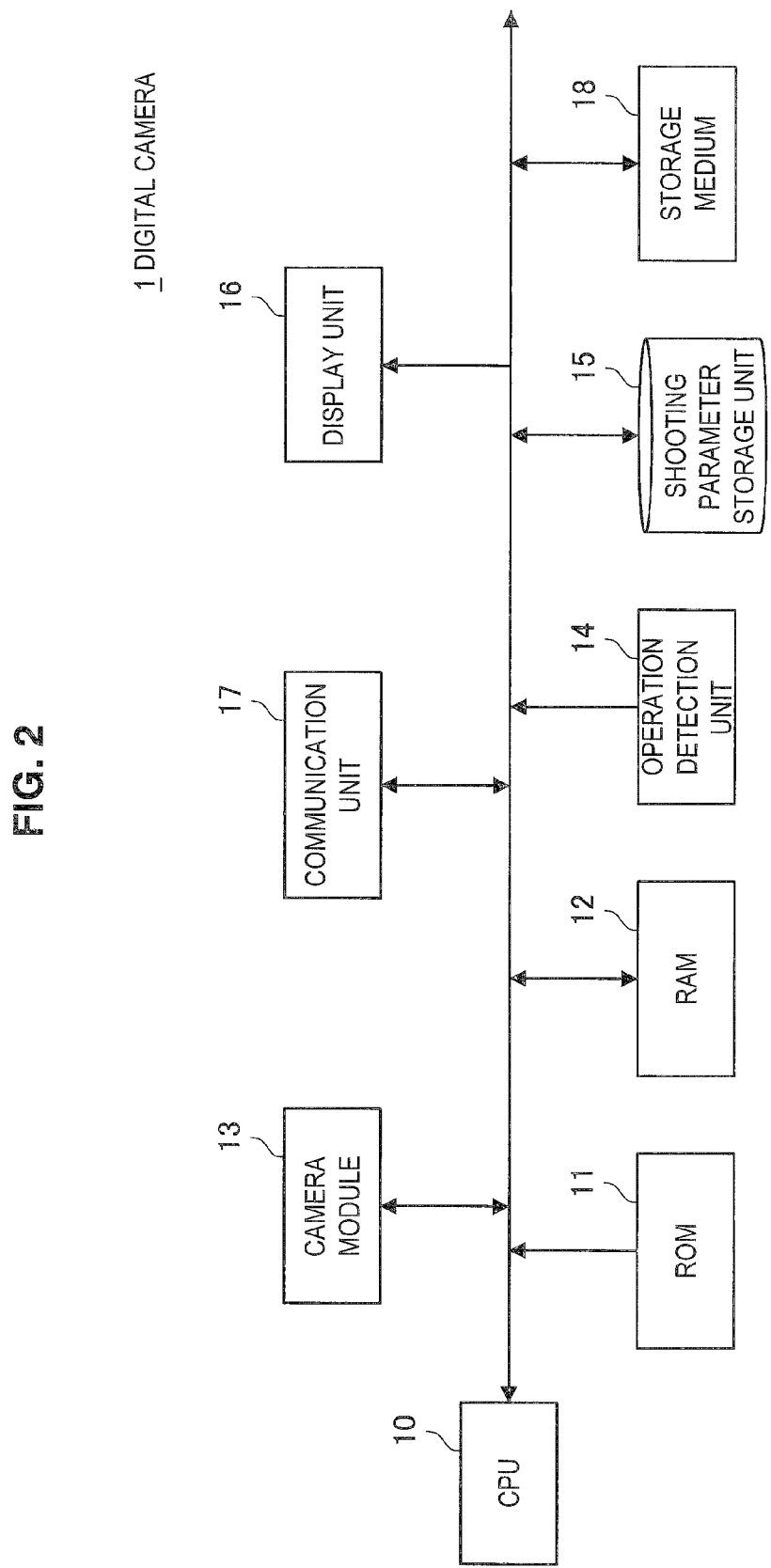
FIG. 2 is a block diagram illustrating a hardware configuration of a digital camera according to an embodiment of the present disclosure.

FIG. 2 is a block diagram showing a configuration of the digital camera 1 according to the present embodiment. As shown in FIG. 2, the digital camera 1 includes a CPU 10, ROM 11, RAM 12, a camera module 13, an operation detection unit 14, a shooting parameter storage unit 15, a display unit 16, a communication unit 17, and a storage medium 18. In the following, respective configurations are explained in detail.

The camera module 13 includes an imaging optical system having an image sensor and an imaging lens, and a captured image signal processing unit, and outputs data of the captured image as a digital signal. Note that, the image sensor is achieved by a charge-coupled device (CCD) imager or a complementary metal-oxide-semiconductor (CMOS) imager, for example.

The shooting parameters (ON/OFF of a flash, shutter speed, ISO speed, aperture (f-number), EV shift, exposure mode, white balance, color emphasis, chroma, contrast, sharpness, and the like) of the camera module 13 may be set manually or automatically. Also, the shooting parameters of the camera module 13 may by changed by the shooting parameter changing system according to the present disclosure. Note that the specific contents of the shooting parameter changing system according to the present disclosure will be described in detail in the later section "3. Embodiments".

The operation detection unit 14 is a detection unit to detect camera operation performed by a user. For example, as shown in FIG. 1, the camera operation performed by the user is detected from the shutter button 2, the reshoot button 3, the MOVIE button 4, the dial 6, and the playback button 5 which are physically provided on the digital camera 1. On the other hand, the operation detection unit 14 may detect operation from a touchscreen that detects a touch position of the user on a screen displayed on the display unit 16.

The shooting parameter storage unit 15 is a storage unit realized by a hard disk device or the like, and may store the current shooting parameters, preset shooting parameters, and shooting parameters highly rated by the user as learned data.

The display unit 16 displays not only a menu screen and diverse operation screens, but also a captured image output from the camera module 13 in real time, and displays (plays back) image data (still-image data/moving-image data) stored in the storage medium 18. In addition, the display unit 16 is achieved by a liquid crystal display (LCD), or an organic light-emitting diode (OLED), for example.

The communication unit 17 is a communication interface for performing data communication with an external device.

The storage medium 18 is an image storage unit to store a captured image, and is achieved by a recording medium such as flash memory like card type memory or a digital versatile disc (DVD). In response to operation timings of the shutter button 2, the storage medium 18 may store captured images continuously output from the camera module 13 as still-image data (photographs). Alternatively, in response to operation timings of the MOVIE button 4, the storage medium 18 may store captured images continuously output from the camera module 13 as moving-image data (video).

The CPU 10 is a main control unit that controls the respective components of the digital camera 1. For example, if the operation of the reshoot button 3 is detected by the operation detection unit 14, the CPU 10 executes a process for changing the shooting parameters of the camera module 13 by following a program in the ROM 11. Note that specific functional configurations of the CPU 10 according to the embodiments (CPU 10-1 to 10-3) will be respectively described in detail in the later sections from "3-1. First embodiment" to "3-3. Third embodiment".

The ROM 11 stores information such as a program by which the CPU 10 executes a shooting parameter changing process. In addition, a program stored in the ROM 11 is executed by the CPU 10 using the RAM 12 as a work area.

The foregoing thus describes a basic configuration of a digital camera 1 according to an embodiment of the present disclosure. Next, the changing of shooting parameters by a digital camera 1 according to an embodiment will be specifically described using several embodiments. Herein, the hardware configuration of the digital camera 1 according to each embodiment is not limited to the configuration illustrated in FIG. 2. For example, in the digital camera 1 according to the first embodiment, the communication unit 17 is not a required component.

<<3. EMBODIMENTS>>

<3-1. First Embodiment>

In the shooting parameter changing system according to the first embodiment of the present disclosure, shooting parameters are changed according to the pressing of the reshoot button 3 by the user (a shooting parameter change instruction operation). A functional configuration and an operating process of a CPU 10-1 of such a digital camera 1 according to the first embodiment will be successively described.

(3-1-1. Functional Configuration of CPU 10-1)

Figure 3:
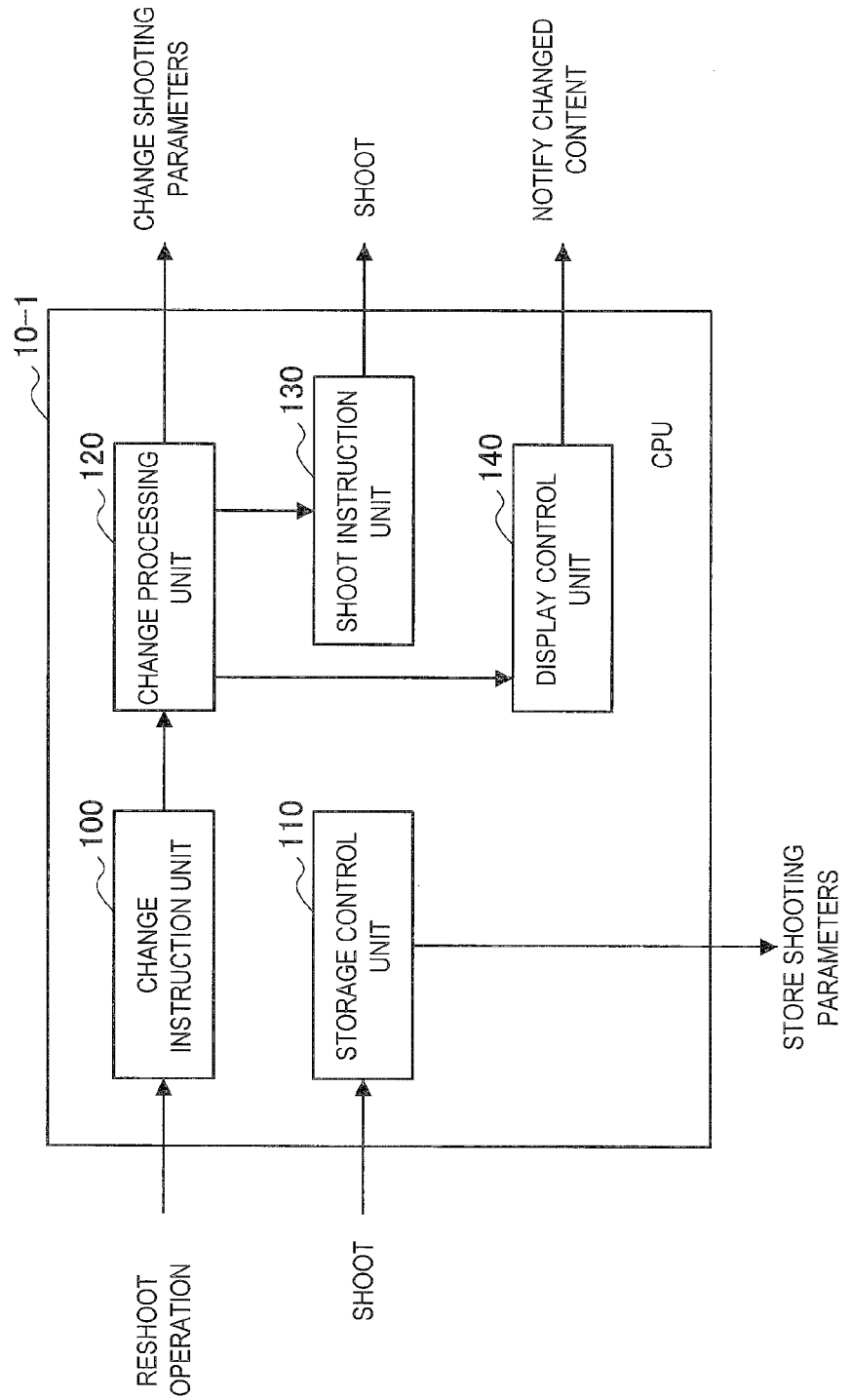
FIG. 3 is a diagram illustrating a functional configuration of a CPU according to the first embodiment.

FIG. 3 is a diagram illustrating a functional configuration of a CPU 10-1 according to the first embodiment. As illustrated in FIG. 3, the CPU 10-1 includes a change instruction unit 100, a storage control unit 110, a change processing unit 120, a shoot instruction unit 130, and a display control unit 140.

(Change Instruction Unit 100)

The change instruction unit 100 instructs the change processing unit 120 to start a shooting parameter changing process if the operation detection unit 14 detects a reshoot operation by the user (a shooting parameter change instruction operation). Note that the instruction by such a change instruction unit 100 does not indicate the changes in the shooting parameters (such as shooting parameter values configured by manual operations), but rather gives an instruction to carry out a change according to the present embodiment. Also, the reshoot operation may be detected by the operation detection unit 14 when the reshoot button 3 illustrated in FIG. 1 is pressed, or when a reshoot button (not illustrated) displayed on the display unit 16 is touched.

(Storage Control Unit 110)

When the camera module 13 conducts shooting, the storage control unit 110 controls the shooting parameter storage unit 15 to store the shooting parameters at that time. For example, in the case of shooting using the auto function, shooting parameters within a fixed range depending on the environment are configured, and the storage control unit 110 causes the shooting parameters configured according to the environment to be stored.

(Change Processing Unit 120)

The change processing unit 120, when instructed by the change instruction unit 100 to change the shooting parameters, conducts processing to change the respective shooting parameters of the camera module 13. The change processing unit 120 is able to change the shooting parameters without being limited within the fixed range configured as the auto function, and also without relying on the surrounding environment.

More specifically, the change processing unit 120 may decide how much to change the shooting parameters according to a detected reshoot operation. For example, as the length of the press/touch time becomes longer (a long press), or as the strength of the press/touch becomes stronger, the shooting parameters are changed greatly, while as the length of the press/touch time becomes shorter (a half-press), or as the strength of the press/touch becomes lighter, the shooting parameters are changed slightly. The relative strength of the press/touch may be judged on the basis of a pressure value sensed by a pressure sensor, or by the contact surface area on the touch panel. Additionally, if the digital camera 1 includes an acceleration sensor or the like, and the degree of shaking of the digital camera 1 (device) may be sensed, the change processing unit 120 may decide how much to change the shooting parameters according to the relative strength of the degree of shaking Additionally, if magnitude buttons indicating how much to change the shooting parameters are provided, the change processing unit 120 decides the magnitude of how much to change the shooting parameters according to which button is selected.

Additionally, if a slide bar indicating how much to change the shooting parameters is provided, the change processing unit 120 decides the magnitude of how much to change the shooting parameters according to the operation direction.

Furthermore, the change processing unit 120 may also change the shooting parameters on the basis of a random number. By having the change processing unit 120 randomly change the shooting parameters without relying on the surrounding environment, repeated failure due to conducting auto shooting many times may be prevented, and as a result, optimal shooting parameters may be acquired.

Alternatively, the change processing unit 120 may also change the shooting parameters on the basis of learned data. Herein, learned data refers to the shooting parameters of a photo that was rated highly by the user, and may be stored as learned data in the shooting parameter storage unit 15.

Figure 4:
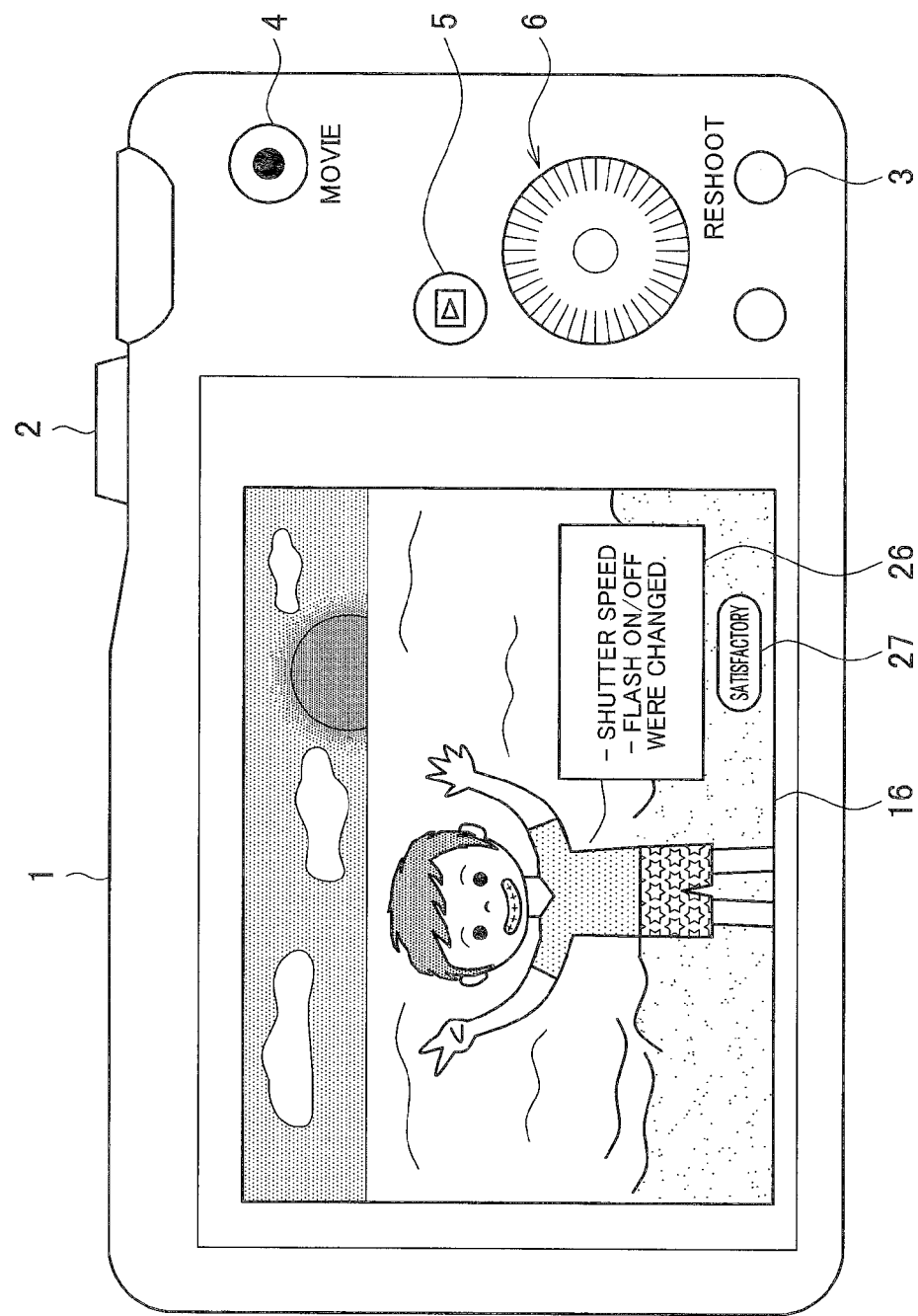
FIG. 4 is a diagram illustrating an exemplary display of a satisfactory button for receiving a user's rating.

For example, when shooting with shooting parameters changed by the change processing unit 120 and displaying the shot image (captured image) on the display unit 16, the display control unit 140 jointly displays a satisfactory button 27 for receiving the user's rating, as illustrated in FIG. 4. If the satisfactory button 27 is touched (if a high rating is given), the shooting parameter storage unit 15 associates and stores the relevant shooting parameters and the conditions at the time of shooting as learned data. The conditions at the time of shooting may be factors such as the time, place, weather, indoors/outdoors, composition (such as a landscape image, portrait image, and the arrangement of people and landscape), and the speed of subject motion.

Subsequently, the change processing unit 120 changes to shooting parameters associated with conditions corresponding to the current conditions from among the learned data stored in the shooting parameter storage unit 15. Consequently, the change processing unit 120 is able to change to shooting parameters which are actually used and which also reflect the user's preferences, rather than rigidly uniform shooting parameters preconfigured by the auto function.

Additionally, the change processing unit 120 may also change the shooting parameters on the basis of emergency shooting parameters configured as a countermeasure for preconceived shooting difficulties. For example, emergency shooting parameters may be stored in the shooting parameter storage unit 15 to accommodate compositions expected by experienced photographers to cause shooting difficulties, such as backlit compositions at sunset and sunrise, and complex compositions. The change processing unit 120 may then change on the basis of relevant emergency shooting parameters.

The foregoing thus specifically describes shooting parameter changing methods by the change processing unit 120. Note that the change processing unit 120 may change at least one shooting parameter from among multiple shooting parameters. The change processing unit 120 may randomly decide which shooting parameters to change, or decide shooting parameters that are expected to be an improvement during shooting difficulties, such as ON/OFF of the flash and the shutter speed.

(Shoot Instruction Unit 130)

The shoot instruction unit 130, upon receiving a notification of a shooting parameter change by the change processing unit 120, controls the camera module 13 to conducting shooting. As a result, the user is able to acquire a captured image with changed shooting parameters by simply pressing the reshoot button 3, for example.

(Display Control Unit 140)

The display control unit 140 is able to notify the user of the changes by controlling the display unit 16 to indicate how the shooting parameters were changed by the change processing unit 120. For example, the display control unit 140 may control the display unit 16 to display a notification display 26 indicating the changes in the shooting parameters, together with the captured image, as illustrated in FIG. 4. Consequently, the user is able to check how the shooting parameters were changed. Also, if one of multiple shooting parameters is changed, the display control unit 140 may notify the user of changes indicating which shooting parameter was changed, and by how much. Furthermore, the display control unit 140 may also jointly display an operating screen for receiving a user operation about whether or not to make additional changes to the changed shooting parameters.

(3-1-2. Operating Process)

Figure 5:
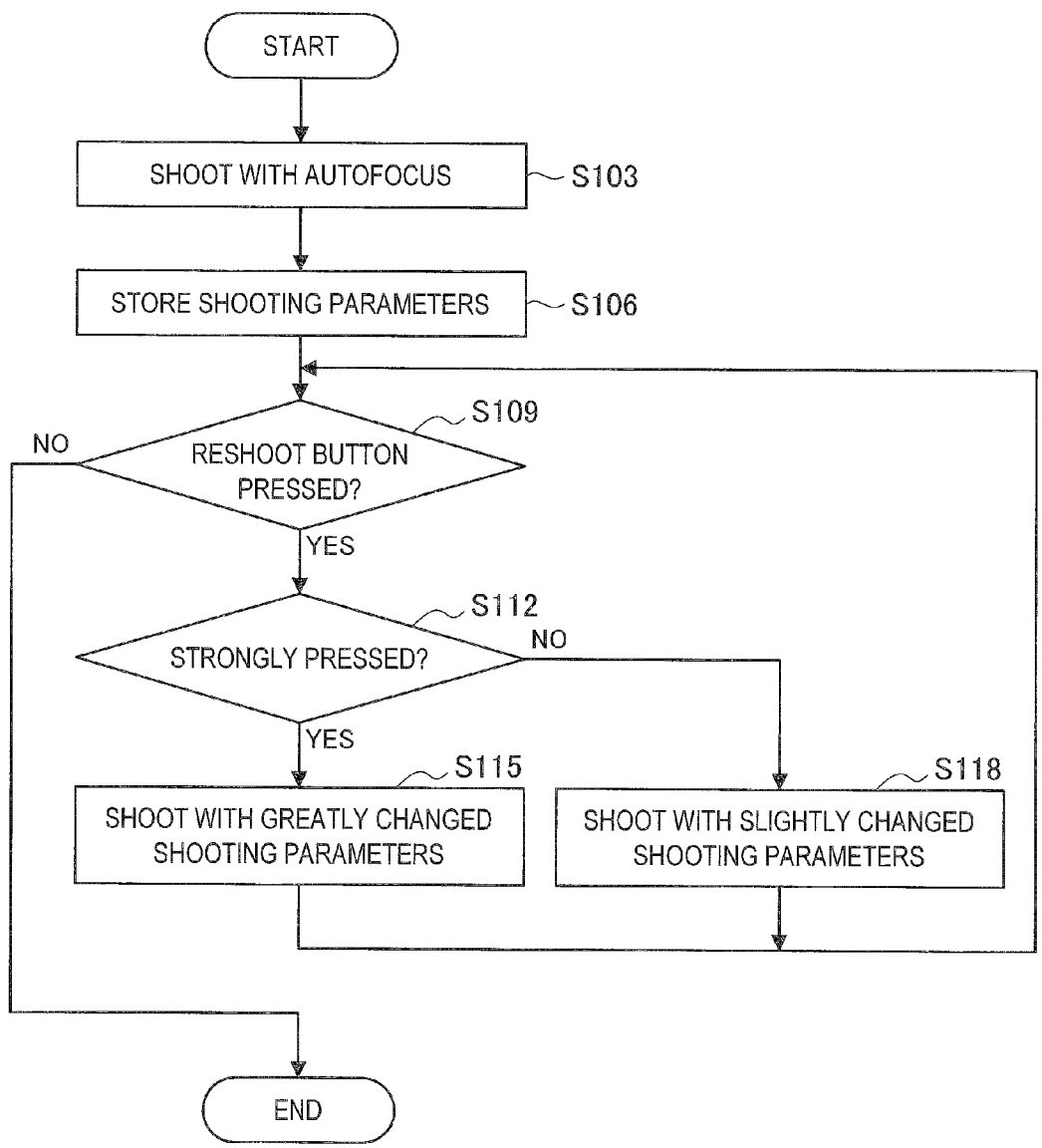
FIG. 5 is a flowchart illustrating an operating process according to the first embodiment.

Next, an operating process of the shooting parameter changing system according to the first embodiment will be described with reference to FIG. 5. FIG. 5 is a flowchart illustrating an operating process according to the first embodiment. As illustrated in FIG. 5, first, in step S103, the digital camera 1 shoots with autofocus, and displays the shot image (captured image) on the display unit 16. Subsequently, in step S106, the storage control unit 110 stores the shooting parameters from the autofocus shot in the shooting parameter storage unit 15.

Next, in step S109, the change instruction unit 100 judges whether or not the reshoot button 3 was pressed, on the basis of a detection result from the operation detection unit 14. If it is judged that the reshoot button 3 was pressed, the change instruction unit 100 transmits a shooting parameter change instruction to the change processing unit 120.

Subsequently, if the reshoot button 3 is pressed and the shooting parameter change instruction is transmitted to the change processing unit 120, in step S112, the change processing unit 120 judges whether or not the reshoot button 3 was strongly pressed, on the basis of a detection result from the operation detection unit 14.

Subsequently, if it is judged that the reshoot button 3 was strongly pressed, in step S115, the change processing unit 120 controls the camera module 13 to greatly change the shooting parameters. Also, the shoot instruction unit 130 that receives the shooting parameter change instruction from the change processing unit 120 controls the camera module 13 to shoot with the changed shooting parameters.

On the other hand, if it is judged that the reshoot button 3 was lightly pressed, in step S118, the change processing unit 120 controls the camera module 13 to slightly change the shooting parameters. Also, the shoot instruction unit 130 that receives the shooting parameter change instruction from the change processing unit 120 controls the camera module 13 to shoot with the changed shooting parameters.

In this way, the shoot instruction unit 130 greatly/slightly changes the shooting parameters in step S115/S118, and reshoots. Subsequently, the above steps S109 to S118 are repeated every time the user is dissatisfied with the shot image and presses the reshoot button 3 (step S109/Yes). Note that in the example illustrated in FIG. 5, after step S115/S118, the process returns to the processing indicated in step S109, but the operating process of the present embodiment is not limited thereto, and after step S115/S118, the process may also return to the processing indicated in S106.

The foregoing thus describes an operating process of a shooting parameter changing system according to the present embodiment. Note that although the operating process illustrated in FIG. 5 uses as an example a method that decides how much to change the shooting parameters according to the strength of the pressing of the reshoot button 3, the shooting parameter changing method according to the present embodiment is not limited thereto. As discussed earlier, the change processing unit 120 may also change the shooting parameters on the basis of factors such as the time that the reshoot button 3 is pressed, or a random number. Next, supplementary remarks about the shooting parameter changing system according to the present embodiment will be given.

(3-1-3. Supplementary Remarks)

If the satisfactory button 27 illustrated in FIG. 4 is touched, or if a Back button (not illustrated) is selected, the change processing unit 120 may refer to the pre-change shooting parameters held in the shooting parameter storage unit 15, and apply control to revert back the shooting parameters of the camera module 13.

In addition, after the shooting indicated in the above step S115 or S118 is conducted, if the user presses the reshoot button 3 again, the change processing unit 120 may apply control to change the shooting parameters even more greatly. Also, in this case, the same shooting parameters as last time may be changed even more greatly, or other shooting parameters may be changed. Note that the change processing unit 120 may also receive the user's rating of the change in the shooting parameters, and conduct a process to change other shooting parameters if the rating is good, or conduct a process to change the same shooting parameters again if the rating is bad.

In addition, besides the case in which a reshoot operation by the user (a shooting parameter change operation) is detected, the change instruction unit 100 may also automatically transmit the shooting parameter change instruction. For example, if shooting is conducted a designated number of times or more with the same composition, there is a high likelihood of repeated failure, and thus the change instruction unit 100 transmits the shooting parameter change instruction to the change processing unit 120.

The foregoing thus describes in detail the shooting parameter changing system according to the first embodiment. According to the present embodiment, repeated failure due to conducting auto shooting many times may be prevented, and in addition, by changing the shooting parameters without relying on the surrounding environment, suitable shooting parameters may be configured as a result.

<3-2. Second Embodiment>

Although the change processing unit 120 according to the first embodiment discussed above changes the shooting parameters without communicating with an external device, a shooting parameter changing method according the present disclosure is not limited thereto, and shooting parameters may also be changed on the basis of communication with an external device, for example. Hereinafter, an overview of a shooting parameter changing system according to the second embodiment that changes shooting parameters on the basis of communication with an external device will be described with reference to FIG. 6.

(3-2-1. Overview)

Figure 6:
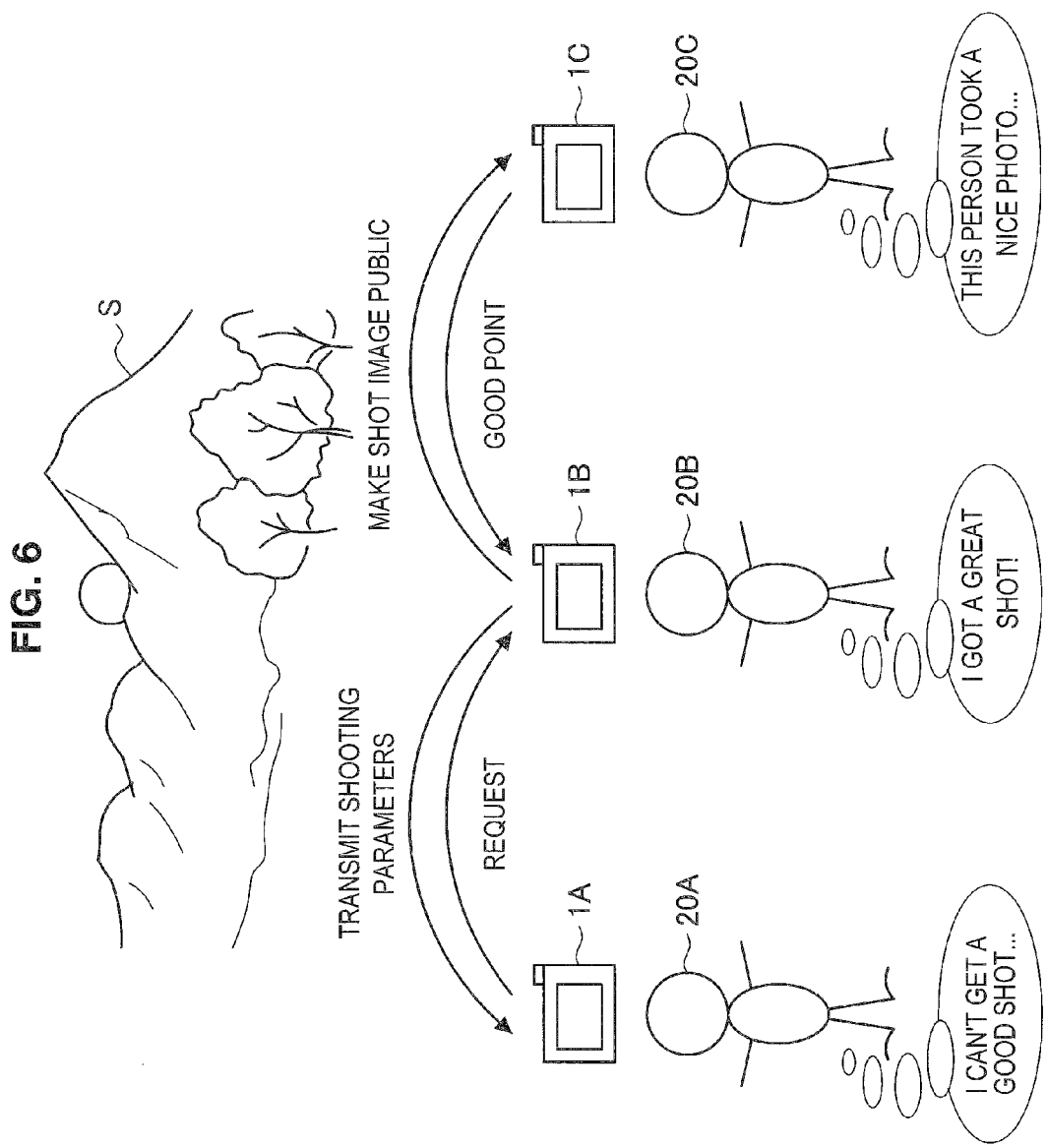
FIG. 6 is a diagram illustrating an overview of a shooting parameter changing system according to the second embodiment.

As illustrated in FIG. 6, the shooting parameter changing system according to the second embodiment includes multiple digital camera 1A to 1C. For example, imagine a situation in which photographers 20A to 20C are shooting the same subject S with the respective digital cameras 1A to 1C at a tourist location. The photographer 20A is unable to take a good shot even after shooting many times, whereas the neighboring photographer 20B is taking a good shot. At this point, if the digital camera 1A could acquire shooting parameters from the digital camera 1B and change the shooting parameters of the digital camera 1A to the relevant shooting parameters, it may be possible to prevent repeated failure.

In this way, in the second embodiment, digital cameras conduct data communication with each other, and are thereby able to acquire suitable shooting parameters. In a situation that is difficult to shoot with the auto function, such as a sunset, the user is able to receive help from nearby people and shoot a satisfactory, good-looking photograph. In addition, since there are many photographers at photo spots such as tourist locations, it is easy to realize data communication (the acquisition of shooting parameters) between digital cameras according to the present embodiment.

Also, in the present embodiment, a shot image that the photographer judges to be a good shot may be made public to nearby photographers (users), and thus may receive ratings from nearby users (the photographer 20C, for example). In this case, the digital camera 1A acquires from another digital camera the shooting parameters of a shot image that has received a high rating.

Note that since the hardware configuration of the digital cameras 1A to 1C according to the present embodiment is similar to the hardware configuration of the digital camera 1 according to the first embodiment described with reference to FIG. 2, description herein will be reduced or omitted. However, the functional configuration of the CPU 10 (CPU 10-2) included in the digital camera 1A according to the second embodiment partially differs from the functional configuration of the CPU 10 (CPU 10-1) of the digital camera 1 according to the first embodiment, and thus will be specifically described hereinafter with reference to FIG. 7.

(3-2-2. Functional Configuration of CPU 10-2)

Figure 7:
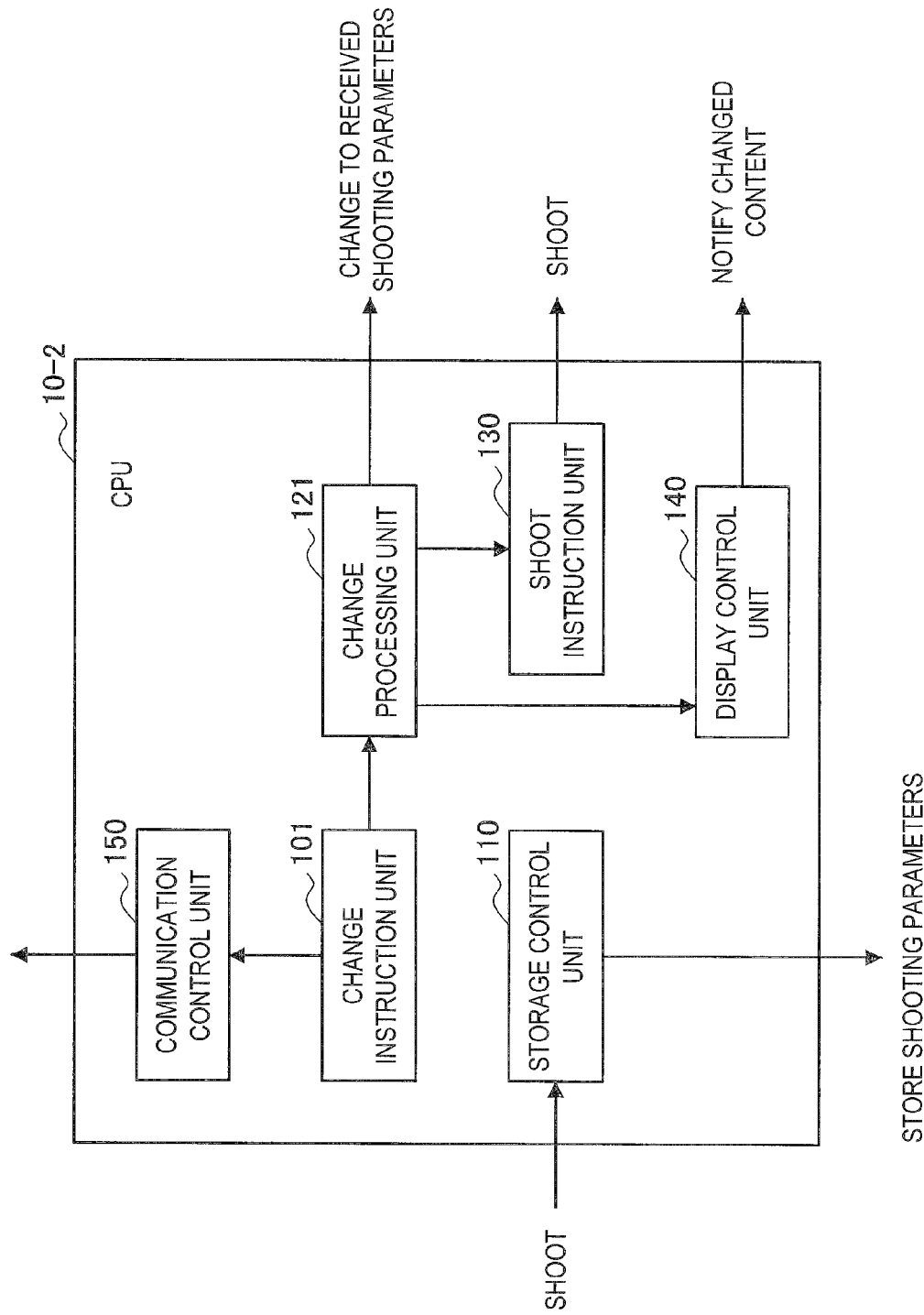
FIG. 7 is a diagram illustrating a functional configuration of a CPU of a digital camera according to the second embodiment.

FIG. 7 is a diagram illustrating a functional configuration of the CPU 10-2 of the digital camera 1A according to the second embodiment. As illustrated in FIG. 7, the CPU 10-2 includes a change instruction unit 101, a storage control unit 110, a change processing unit 121, a shoot instruction unit 130, a display control unit 140, and a communication control unit 150. Note that since the storage control unit 110, the shoot instruction unit 130, and the display control unit 140 are similar to the respective components described with reference to FIG. 3, description herein will be reduced or omitted.

(Change Instruction Unit 101)

The change instruction unit 101 judges whether or not shooting has been conducted a designated number of times or more with the same composition, on the basis of captured images output from the camera module 13. Subsequently, in the case of judging that shooting has been conducted a designated number of times or more with the same composition, the change instruction unit 101 instructs the communication control unit 150 to request the transmission of shooting parameters. Additionally, the change instruction unit 101 instructs the change processing unit 120 to change the shooting parameters.

(Communication Control Unit 150)

The communication control unit 150 controls the communication unit 17, and controls the transmitting of data to a nearby external device or the receiving of data from a nearby external device. For example, the communication control unit 150, when instructed to change the shooting parameters from the change instruction unit 101, transmits a shooting parameter transmission request to a nearby external device. In addition, the communication control unit 150 controls the receiving of shooting parameters transmitted from an external device in response to a transmission request.

Herein, an external device refers to an information processing device including a communication function, such as a digital camera, a digital video camera, a mobile phone, or a smartphone. Also, the communication unit 17 according to the present embodiment transmits and receives data with an external device by infrared communication or a short-range/close-proximity wireless communication such as Wi-Fi. Additionally, the communication unit 17 according to the present embodiment may also transmit and receive data with an external device by contact-based or contactless communication.

(Change Processing Unit 121)

The change processing unit 121, when instructed to change the shooting parameters from the change instruction unit 101, conducts processing to change the respective shooting parameters of the camera module 13 on the basis of shooting parameters received from an external device (herein, the digital camera 1B) in response to a transmission request by the communication control unit 150.

The foregoing thus describes a functional configuration of the digital camera 1A according to the second embodiment. Next, the shooting parameter changing process according to the present embodiment will be described with reference to FIG. 8.

(3-2-3. Operating Process)

Figure 8:
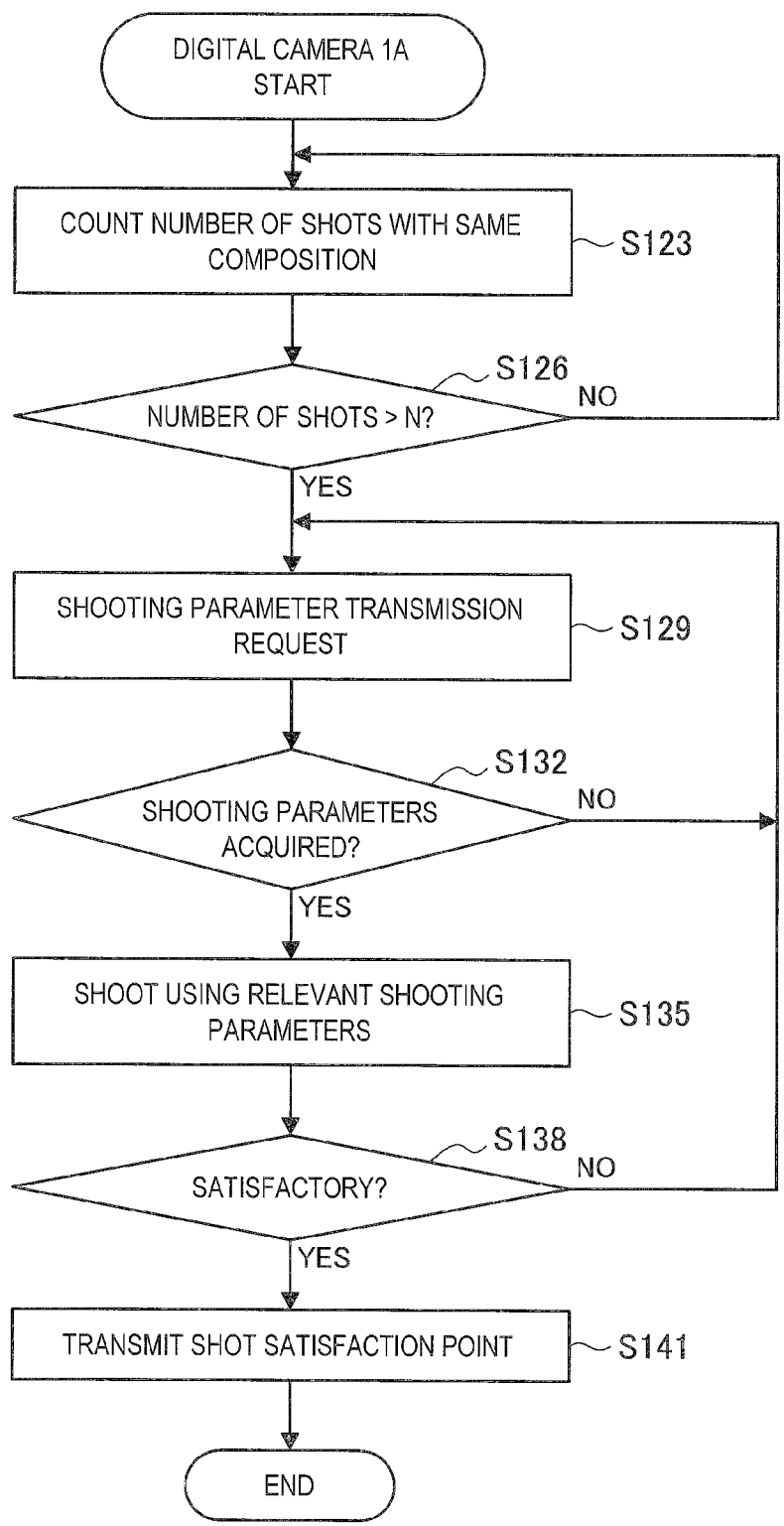
FIG. 8 is a flowchart illustrating a shooting parameter changing process according to the second embodiment.

FIG. 8 is a flowchart illustrating a shooting parameter changing process according to the second embodiment. As illustrated in FIG. 8, first, in step S123, the change instruction unit 101 counts the number of shots taken with the same composition, on the basis of captured images output from the camera module 13.

Subsequently, in step S126, the change instruction unit 101 judges whether or not the number of shots exceeds a designated value N. Next, if the number of shots exceeds the designated value N, in step S129, the change instruction unit 101 instructs the communication control unit 150 to transmit a shooting parameter transmission request. When instructed to transmit a transmission request, the communication control unit 150 controls the communication unit 17 to transmit a shooting parameter transmission request to the nearby digital cameras 1B and 1C.

Subsequently, in step S132, the change processing unit 121 judges whether or not shooting parameters were acquired via the communication unit 17.

Next, if it is judged that shooting parameters were acquired (S132/Yes), in the following step S135, the change processing unit 121 conducts processing to change the respective shooting parameters of the camera module 13 to the acquired (received) shooting parameters. Also, the change processing unit 121 informs the shoot instruction unit 130 that the shooting parameters have changed, and the change processing unit 130 controls the camera module 13 to shoot with the changed shooting parameters.

Consequently, if the digital camera 1A according to the present embodiment is repeatedly shooting many times with the same composition, by automatically acquiring and changing to shooting parameters from another digital camera 1B/1C, repeated failure may be prevented.

Subsequently, in step S138, the change instruction unit 101 judges whether or not the user (photographer 20A) is satisfied with the captured image. For example, if the photographer 20A is satisfied with the captured image shot with shooting parameters acquired from another digital camera 1B/1C, the photographer 20A may touch the satisfactory button 27 displayed together with the captured image (see FIG. 4). Thus, if the operation detection unit 14 detects that the satisfactory button 27 has been touched, the change instruction unit 101 is able to judge that the photographer 20A is satisfied with the captured image.

Next, if it is judged that the photographer 20A is satisfied with the captured image (S138/Yes), in step S141, the communication control unit 150 transmits a shot satisfaction point to the digital camera 1B/1C that transmitted the shooting parameters. Additionally, the communication control unit 150 may also jointly transmit a thank-you message to the digital camera 1B/1C that transmitted the shooting parameters.

(3-2-4. Supplementary Remarks)

Besides automatically transmitting a shooting parameter change instruction in cases such as when shooting is conducted a designated number of times or more with the same composition, the change instruction unit 100 according to the second embodiment discussed above may also transmit a change instruction when triggered by the detection of a press operation on the reshoot button 3 by the user.

Additionally, in the second embodiment discussed above, the communication control unit 150 of the digital camera 1A may also transmit the shooting parameter transmission request by broadcasting to multiple nearby digital cameras 1B/1C. Consequently, since the digital camera 1A may acquire shooting parameters from a nearby digital camera in response to the request, repeated shooting failure may be prevented.

In addition, the communication control unit 150 of the digital camera 1A may also transmit the shooting parameter transmission request to a nearby digital camera specified by the user. Consequently, if a shot image that was shot with the digital camera 1B by the neighboring photographer 20B matches the preferences of the photographer 20A (the user), for example, the digital camera 1A acquires the shooting parameters of the relevant shot image from the digital camera 1B.

In addition, the digital camera 1B/1C that receives the transmission request from the digital camera 1A may also control the transmission of shooting parameters to the digital camera 1A if the photographer 20A/20C gives permission. The permission of the photographer 20B/20C may be configured in advance for each shot image. Additionally, if a shooting parameter sharing mode is ON in the digital camera 1B/1C, permission to transmit shooting parameters may be configured for all shot images.

In addition, if a shot image is published and receives a high rating from other people (for example, Good points equal to or greater than a designated threshold value are acquired), and if the photographer 20B/20C gives permission, the digital camera 1B/1C may transmit the shooting parameters in response to a transmission request from the digital camera 1A. Consequently, the digital camera 1A is able to acquire shooting parameters of a shot image with an objectively high rating. Hereinafter, an operating process of the digital camera 1B according to the present embodiment that transmits shooting parameters in response to a rating from another person will be described with reference to FIG. 9.

Figure 9:
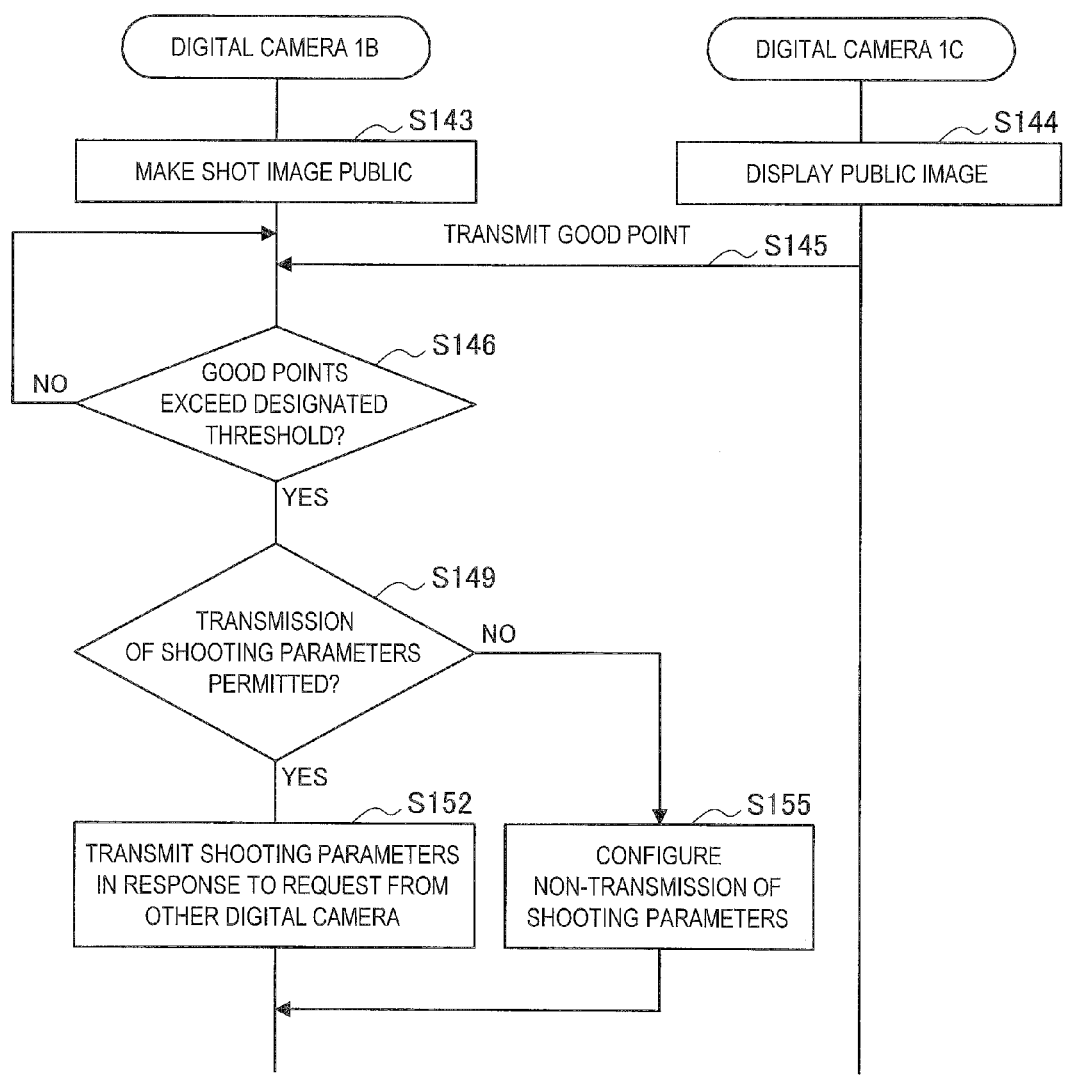
FIG. 9 is a flowchart illustrating an operating process of a digital camera on the shooting parameter transmitting side according to the second embodiment.

As illustrated in FIG. 9, first, in step S143, the digital camera 1B publishes a shot image to nearby information processing devices according to a user operation.

Figure 10:
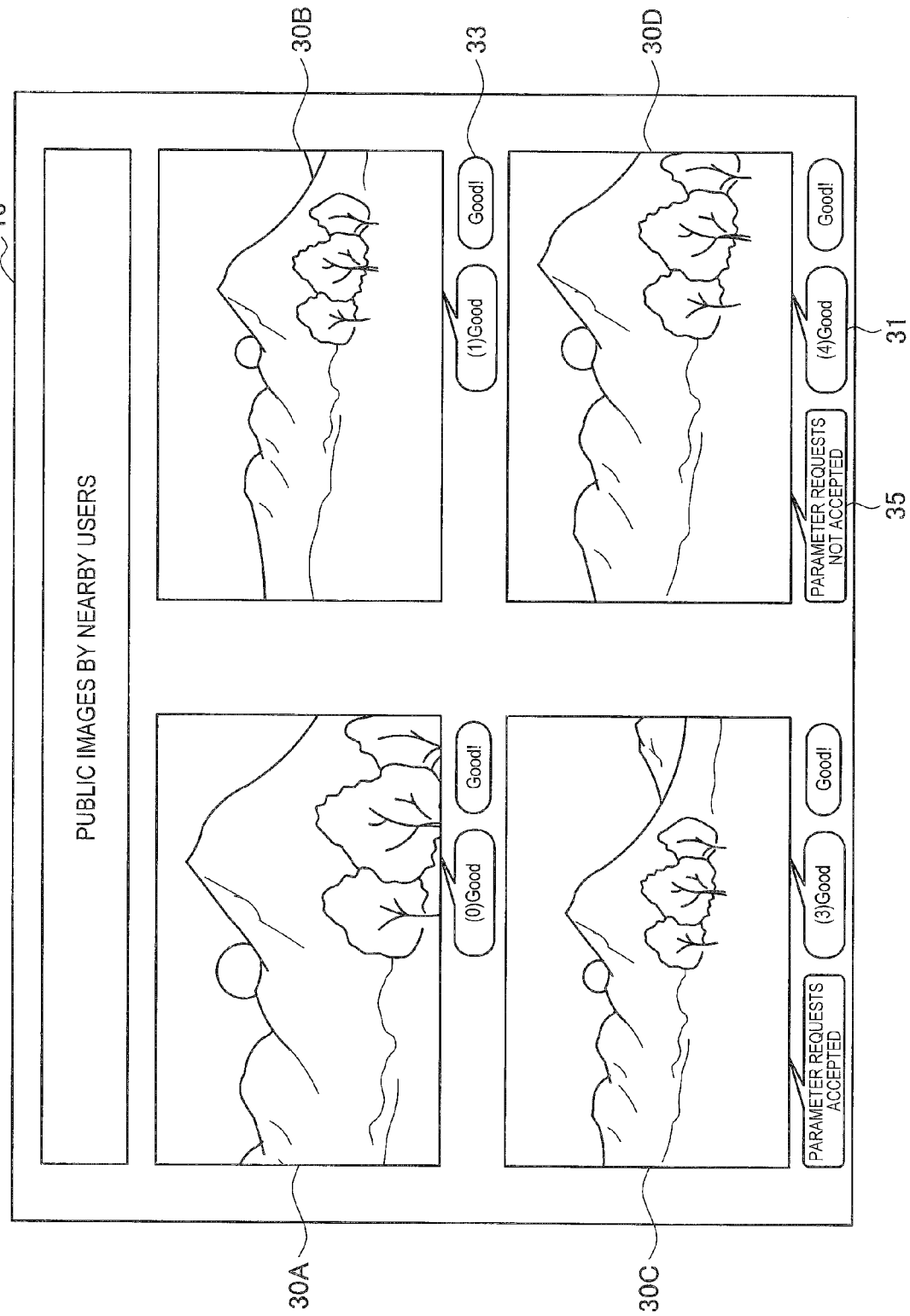
FIG. 10 is a diagram illustrating an exemplary display of public images by nearby users.

Meanwhile, in step S144, the digital camera 1C displays on the display unit 16 captured images published by nearby information processing devices as public images 30A to 30D by nearby users, as illustrated in FIG. 10, for example.

Next, in step S144, the digital camera 1C receives a rating for the public image by the photographer 20C, and transmits the rating result to the publishing information processing device (for example, the digital camera 1B). For example, as illustrated in FIG. 10, if the Good button 33 displayed together with the public images 30A to 30D by nearby users is touched, the digital camera 1C transmits a Good point as the rating result.

Subsequently, in step S146, the digital camera 1B judges whether or not the acquired Good points exceed a designated threshold value. Note that although the example illustrated in FIG. 9 indicates the case of receiving a Good point from the digital camera 1C as an example, the configuration is not limited thereto. It is also possible for the digital camera 1B according to the present embodiment to also receive a Good point from other information processing devices.

Next, if the Good points exceed the designated threshold value (step S146/Yes), in step S149, the digital camera 1B receives the permission of the photographer B about whether to transmit the shooting parameters of the shot image having Good points that exceed the designated threshold value.

Subsequently, if transmission permission is given (step S149/Yes), in step S152, if there is a shooting parameter transmission request from another digital camera (for example, the digital camera 1A), the digital camera 1B transmits the shooting parameters in response to the request.

On the other hand, if transmission permission is not given (step S149/No), in step S155, the digital camera 1B configures non-transmission of shooting parameters for the relevant shot image.

The foregoing thus describes, as supplementary remarks according to the second embodiment, an operating process of a digital camera that transmits shooting parameters in response to a rating from another person. Note that in the above step S146, the digital camera 1B judges whether or not the Good points exceed a designated threshold value, but is not limited thereto, and may also judge whether or not a shot image has been selected by majority decision, for example.

Specifically, in the present embodiment, a display 31 indicating the number of acquired Good points may be displayed together with multiple public images 30A to 30C as illustrated in FIG. 10, and the public image with the highest number of Good points from among the public images 30A to 30C may be treated as the image selected by majority decision.

Also, in the above step S155, if the shooting parameter non-transmission configuration is conducted, the digital camera 1B may, when publishing the relevant shot image to another digital camera, also attach a display 35 indicating that shooting parameter requests will not be accepted, as illustrated in FIG. 10.

<3-3. Third Embodiment>

In the shooting parameter changing system according to the first and second embodiments described above, shooting parameters are changed when the user is not satisfied with a shot, such as when the reshoot button 3 is pressed, or when shooting is conducted many times with the same composition. However, the shooting parameter changing system according to the present disclosure is not limited thereto. For example, shooting parameters may also be changed when the user is satisfied with the shot, for example.

Figure 11:
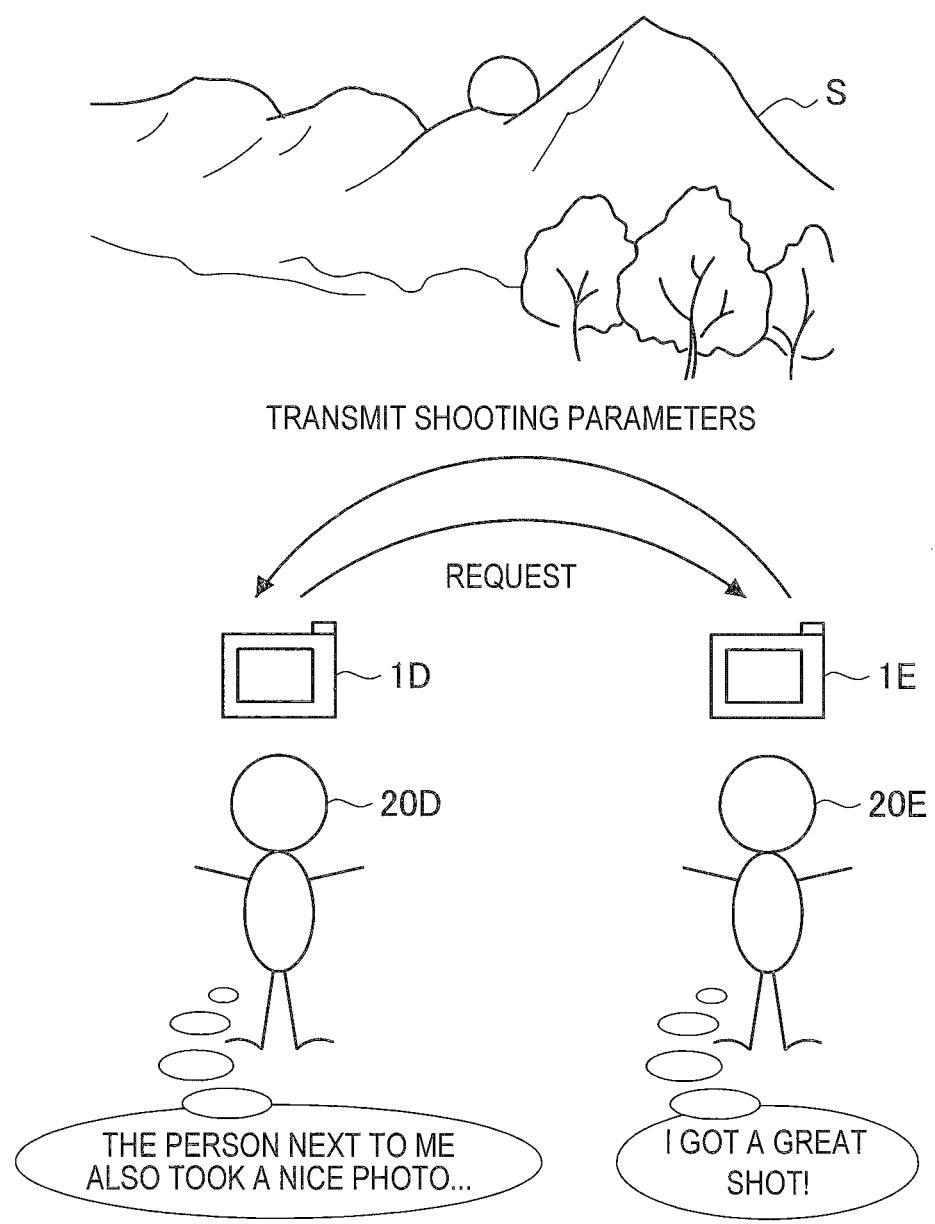
FIG. 11 is a diagram illustrating an overview of a shooting parameter changing system according to the third embodiment.

Specifically, as illustrated in FIG. 11, for example, imagine a case in which, even though a photographer 20D is satisfied with a shot, an image shot by a photographer 20E present nearby is a preferred shot image. Accordingly, a digital camera 1D according to the third embodiment may transmit a shooting parameter transmission request to a digital camera 1E, which is a nearby information processing device, according to a user operation, receive shooting parameters from the digital camera 1E, and change to the received shooting parameters.

Note that since the hardware configuration of the digital cameras 1D and 1E according to the present embodiment is similar to the hardware configuration of the digital camera 1 according to the first embodiment described with reference to FIG. 2, description herein will be reduced or omitted. However, the functional configuration of the CPU 10 (CPU 10-3) included in the digital camera 1D according to the third embodiment partially differs from the functional configuration of the CPU 10 (CPU 10-1) of the digital camera 1 according to the first embodiment, and thus will be specifically described hereinafter with reference to FIG. 12.

(3-3-1. Functional Configuration of CPU 10-3)

Figure 12:
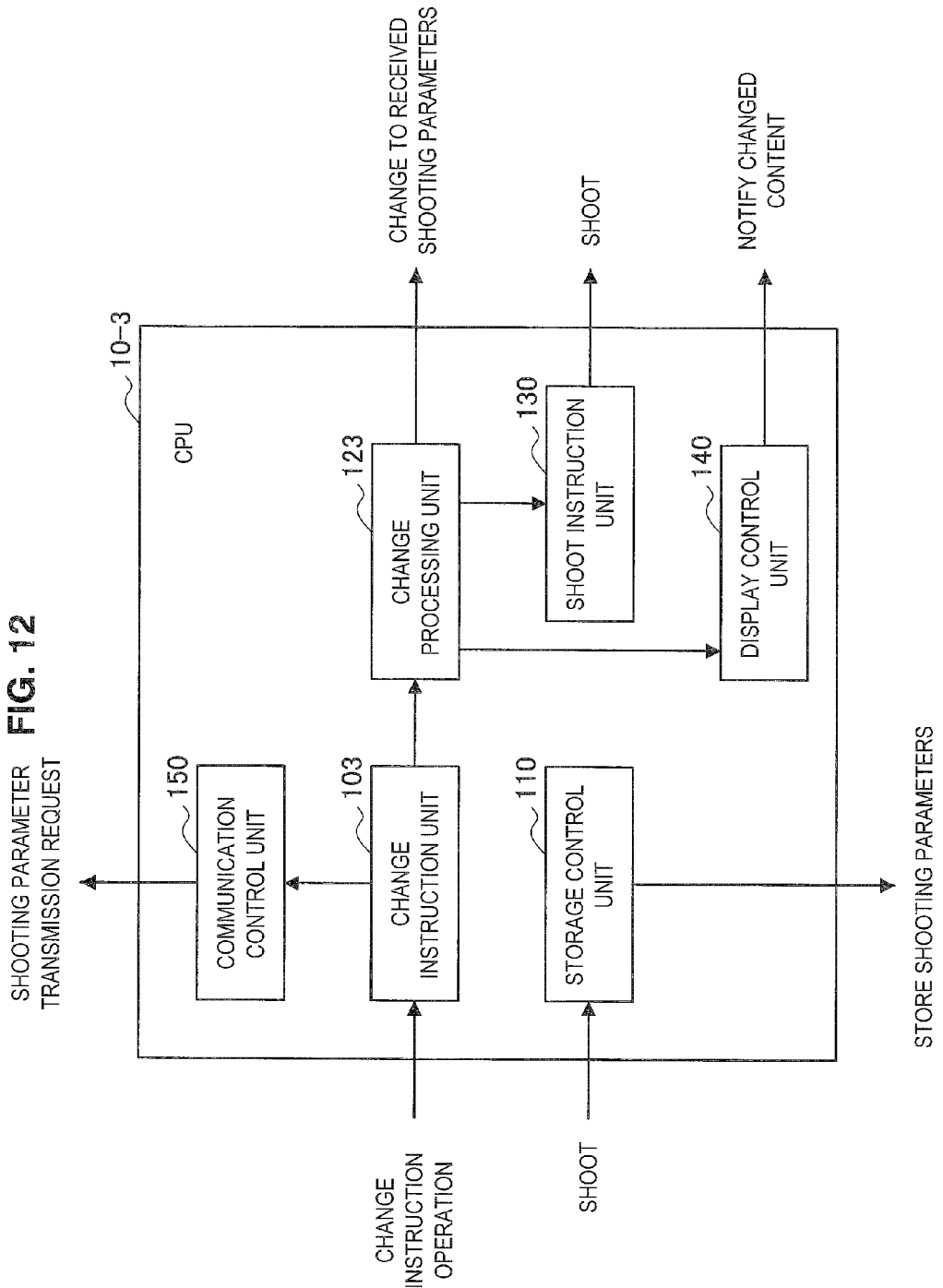
FIG. 12 is a diagram illustrating a functional configuration of a CPU according to the third embodiment.

FIG. 12 is a diagram illustrating a functional configuration of the CPU 10-3 of the digital camera 1D according to the third embodiment. As illustrated in FIG. 12, the CPU 10-3 includes a change instruction unit 103, a storage control unit 110, a change processing unit 123, a shoot instruction unit 130, a display control unit 140, and a communication control unit 150. Note that since the storage control unit 110, the shoot instruction unit 130, the display control unit 140, and the communication control unit 150 are similar to the respective components described with reference to FIGS. 3 and 7, description herein will be reduced or omitted.

(Change Instruction Unit 103)

The change instruction unit 103, in response to a change instruction operation by the user, instructs the communication control unit 150 to transmit a shooting parameter transmission request. Additionally, the change instruction unit 103 instructs the change processing unit 120 to change the shooting parameters.

Herein, a change instruction operation by the user may refer to pressing a button (not illustrated) for a shooting parameter change instruction provided on the digital camera 1D, or touching a button for a shooting parameter change instruction displayed on the display unit 16.

(Change Processing Unit 123)

The change processing unit 123, when instructed to change the shooting parameters from the change instruction unit 103, conducts processing to change the respective shooting parameters of the camera module 13 on the basis of shooting parameters transmitted from an external device in response to a transmission request by the communication control unit 150.

The foregoing thus describes a functional configuration of the digital camera 1D according to the third embodiment. Next, the shooting parameter changing process of the digital camera 1D according to the present embodiment will be described with reference to FIG. 13.

(3-3-2. Operating Process)

Figure 13:
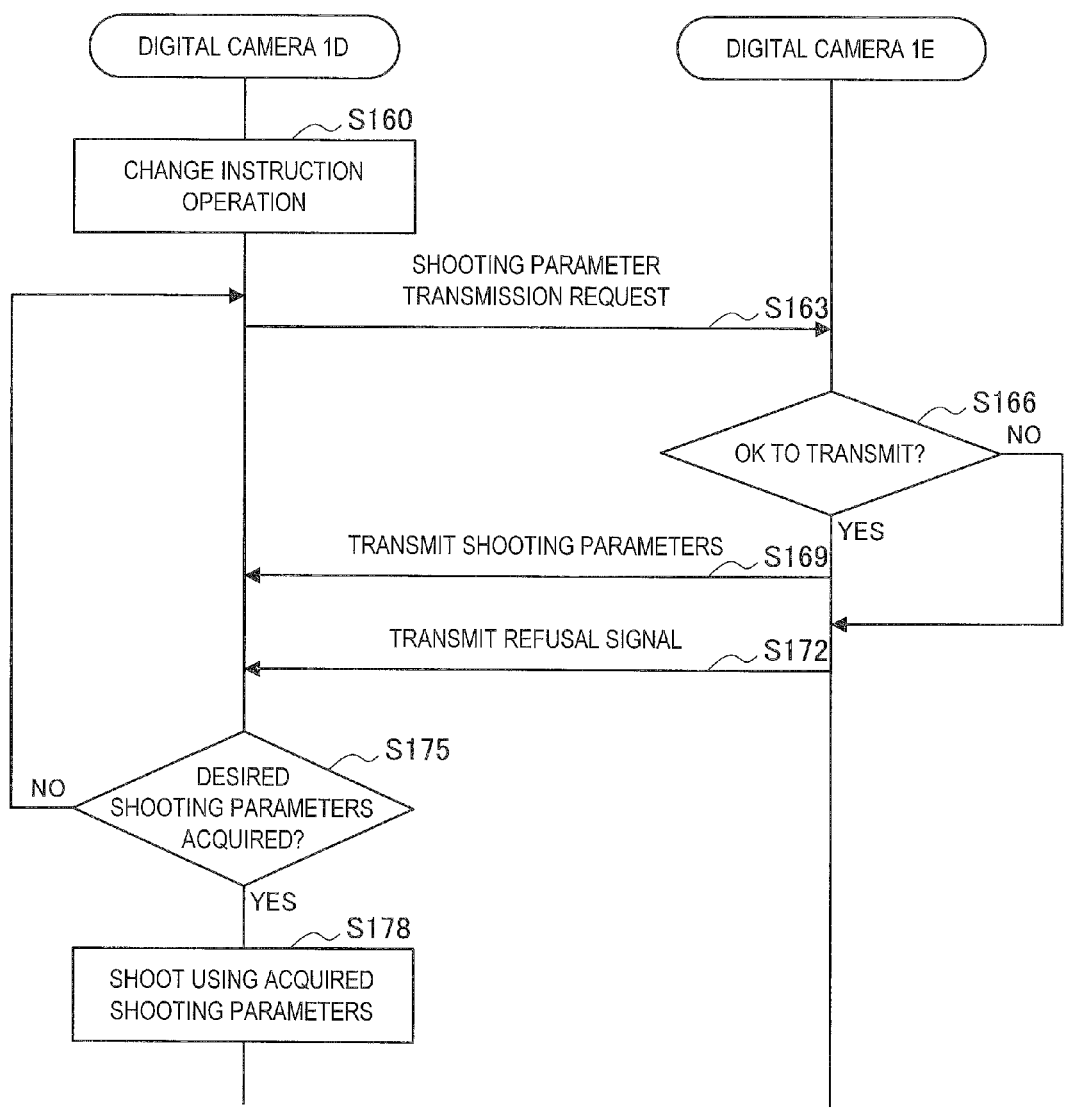
FIG. 13 is a flowchart illustrating a shooting parameter changing process according to the third embodiment.

FIG. 13 is a flowchart illustrating a shooting parameter changing process of the digital camera 1D according to the third embodiment. As illustrated in FIG. 13, first, in step S160, the operation detection unit 14 of the digital camera 1D detects a change instruction operation by the user.

Subsequently, in step S163, the change instruction unit 103 instructs the communication control unit 150 to transmit a shooting parameter transmission request. When instructed to transmit a transmission request, the communication control unit 150 controls the communication unit 17 to transmit a shooting parameter transmission request to the nearby digital camera 1D.

Next, in step S166, the digital camera 1E judges whether or not the transmission of shooting parameters is permitted.

Subsequently, if the transmission of shooting parameters is permitted (S166/Yes), in step S169, the digital camera 1E transmits shooting parameters to the digital camera 1D.

On the other hand, if the transmission of shooting parameters is not permitted (S166/No), in step S172, the digital camera 1E transmits a refusal signal to the digital camera 1D.

Next, in step S175, the change processing unit 123 judges whether or not desired shooting parameters were acquired, on the basis of the data received from the digital camera 1E.

Subsequently, if it is judged that desired shooting parameters were acquired (step S175/Yes), in step S178, the change processing unit 123 conducts processing to change the respective shooting parameters of the camera module 13 to the acquired (received) shooting parameters. Also, the change processing unit 123 informs the shoot instruction unit 130 that the shooting parameters have changed, and the change processing unit 130 controls the camera module 13 to shoot with the changed shooting parameters.

On the other hand, if it is judged that desired shooting parameters were not acquired (step S175/No), the process returns to step S163, and the shooting parameter transmission request is transmitted again. Note that if desired shooting parameters are not acquired even after repeating the transmission request a designated number of times, the display control unit 140 may inform the user by displaying an acquisition failure message.

As described above, according to the shooting parameter system in accordance with the third embodiment, in response to a change instruction operation by the user, desired shooting parameters may be acquired from a nearby digital camera, and the shooting parameters of the camera module 13 may be changed to the desired shooting parameters.

Note that in the present embodiment, the case in which the desired shooting parameters acquired from the nearby digital camera 1E are the same as the shooting parameters currently configured in one's own digital camera 1D is also envisioned. Even in such a case, the change processing unit 123 according to the present embodiment may conduct processing to configure the shooting parameters on the basis of the acquired desired shooting parameters.

<<4. Conclusion>>

As discussed above, in a shooting parameter changing system according to the present disclosure, by changing shooting parameter without relying on the surrounding environment, the shooting parameter changing method may be improved.

More specifically, in the shooting parameter changing system according to the first embodiment, for example, in response to a reshoot operation by the user, shooting parameters are changed on the basis of a designated method, without relying on the surrounding environment, and as a result, suitable shooting parameters may be acquired. As discussed earlier, the designated method may be a method that changes the shooting parameters to a degree corresponding to the relative strength of the operation, or a method that changes the shooting parameter on the basis of a random number, learned data, or emergency shooting parameters.

In addition, in the shooting parameter changing system according to the second embodiment, if shooting is repeated a designated number of times or more with the same composition, a shooting parameter transmission request is transmitted to a nearby external device, shooting parameters are received from a nearby external device, and the shooting parameters are changed on the basis of the received shooting parameters. Consequently, in the present embodiment, since the shooting parameter may be changed without relying on the surrounding environment, ongoing repeated shooting failure may be prevented, and as a result, suitable shooting parameters may be acquired. Also, in the present embodiment, by receiving from an external device shooting parameters that are highly rated by a third party, an optimal shot image may be acquired more reliably.

In addition, in the shooting parameter changing system according to the third embodiment, in response to a change instruction operation by the user, a shooting parameter transmission request is transmitted to a nearby external device, desired shooting parameters are received from the relevant external device, and the shooting parameters are changed on the basis of the received shooting parameters. Consequently, in the present embodiment, shooting parameters for shooting an image matching the user's preferences may be acquired.

The foregoing thus describes preferred embodiments of the present technology in detail and with reference to the attached drawings. However, the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

For example, the digital camera 1 according to an embodiment may also automatically display a suggestion screen stating "Do you want to change the shooting parameters?" or the like in cases such as when shooting is conducted a designated number of times or more with the same composition, and if the user gives a change instruction, the shooting parameter changing process may be conducted.

Additionally, the present technology may also be configured as below.

(1)

An information processing device including:
a storage control unit that causes shooting parameters to be stored;

a change instruction unit that transmits an instruction to change the shooting parameters; and a change processing unit that, in response to the instruction from the change instruction unit, changes the shooting parameters without relying on a surrounding environment, wherein the instruction from the change instruction unit does not indicate content of the change in the shooting parameters, but instructs execution of the change.

(2)

The information processing device according to (1), wherein pre-change shooting parameters stored by the storage control unit are shooting parameters configured according to a surrounding environment.

(3)

The information processing device according to (1) or (2), further including:

an operation detection unit that detects an operation by a user;

wherein the change instruction unit transmits the instruction to change the shooting parameters if the operation detection unit detects a change instruction operation by the user.

(4)

The information processing device according to (3), wherein the change processing unit decides how much to change the shooting parameters according to a change instruction operation detected by the operation detection unit.

(5)

The information processing device according to (4), wherein the change processing unit decides how much to change the shooting parameters according to a length of an operation time, a strength of an operation, or a direction of an operation in the change instruction operation.

(6)

The information processing device according to (1), wherein the change instruction unit transmits the instruction to change the shooting parameters if an imaging operation is conducted a designated number of operations or more with same composition.

(7)

The information processing device according to any one of (1) to (6), wherein the change processing unit changes the shooting parameters on the basis of a random number.

(8)

The information processing device according to any one of (1) to (7), wherein the change processing unit changes the shooting parameters on the basis of learned data.

(9)

The information processing device according to any one of (1) to (8), wherein the change processing unit changes the shooting parameters on the basis of preconfigured emergency shooting parameters.

(10)

The information processing device according to any one of (1) to (8), wherein the shooting parameters are at least one of shutter speed, aperture, EV shift, ISO sensitivity, exposure mode, white balance, color emphasis, chroma, contrast, sharpness, or ON/OFF of a flash.

(11)

The information processing device according to any one of (1) to (10), wherein the change processing unit changes at least one shooting parameter from among a plurality of shooting parameters.

(12)

The information processing device according to any one of (1) to (11), further including:

a notification unit that notifies a user of changed content of the shooting parameters by the change processing unit.

(13)

The information processing device according to any one of (1) to (12), wherein the change processing unit conducts processing to revert changed shooting parameters to the shooting parameters stored by the storage control unit.

(14)

The information processing device according to any one of (1) to (13), further including:

an imaging instruction unit that instructs an imaging unit to conduct imaging on the basis of shooting parameters changed by the change processing unit; and a transmission unit that transmits the shooting parameters to another information processing device according to a user rating for a captured image that was imaged.

(15)

The information processing device according to any one of (1) to (13), further including:

a transmission unit that transmits a request signal to another information processing device according to an instruction from the change instruction unit;

a receiving unit that receives shooting parameters in response to the request signal; and an imaging instruction unit that instructs an imaging unit to conduct imaging on the basis of shooting parameters received by the receiving unit.

(16)

A storage medium storing a program that causes a computer to execute:

a process that causes shooting parameters to be stored;

a process that transmits an instruction to change the shooting parameters; and a process that, in response to the instruction by the process that transmits the instruction to change, changes the shooting parameters without relying on a surrounding environment, wherein the instruction by the process that transmits the instruction to change does not indicate content of the change in the shooting parameters, but instructs execution of the change.

REFERENCE SIGNS LIST

1, 1A to 1E digital camera (information processing device)
2 shutter button
3 reshoot button
4 MOVIE (moving image) button
5 playback button
6 dial
10, 10-1 to 10-3 CPU
100, 101, 103 change instruction unit
110 storage control unit
120, 121, 123 change processing unit
130 shoot instruction unit
140 display control unit
150 communication control unit
11 ROM 12 RAM
13 camera module
14 operation detection unit
15 shooting parameter storage unit
16 display unit
17 communication unit
18 storage medium
20A to 20D photographer
S subject

The invention claimed is:

1. An information processing device comprising:
a Central Processing Unit (CPU) configured to:
cause shooting parameters to be stored in a memory;
detect an instruction to change the shooting parameters; and
change, in response to the detected instruction, the shooting parameters without relying on a surrounding environment,
wherein the detected instruction does not indicate content of the change in the shooting parameters, but instructs execution of the change, and
wherein the CPU is configured to decide an amount of change of the shooting parameters according to a length of an operation time, a strength of an operation, or a direction of the operation in a change instruction operation by a user.

2. The information processing device according to claim 1, wherein pre-change shooting parameters stored by the memory are shooting parameters configured according to the surrounding environment.

3. The information processing device according to claim 1, wherein the detected instruction to change the shooting parameters is based on the change instruction operation by the user.

4. The information processing device according to claim 1, wherein the CPU is configured to decide how much to change the shooting parameters according to the change instruction operation by the user.

5. The information processing device according to claim 1, wherein the CPU is configured to detect the instruction to change the shooting parameters if an imaging operation is conducted a designated number of operations or more with same composition.

6. The information processing device according to claim 1, wherein the CPU is configured to change the shooting parameters on the basis of a random number.

7. The information processing device according to claim 1, wherein the CPU is configured to change the shooting parameters on the basis of learned data.

8. The information processing device according to claim 1, wherein the CPU is configured to change the shooting parameters on the basis of preconfigured emergency shooting parameters.

9. The information processing device according to claim 1, wherein the shooting parameters are at least one of shutter speed, aperture, EV shift, ISO sensitivity, exposure mode, white balance, color emphasis, chroma, contrast, sharpness, or ON/OFF of a flash.

10. The information processing device according to claim 1, wherein the CPU is configured to change at least one shooting parameter from among a plurality of shooting parameters.

11. The information processing device according to claim 1, wherein the CPU is configured to notify a user of changed content of the shooting parameters.

12. The information processing device according to claim 1, wherein the CPU is configured to conduct processing to revert changed shooting parameters to the shooting parameters stored by the memory.

13. The information processing device according to claim 1, wherein the CPU is configured to:
conduct imaging on the basis of changed shooting parameters; and
transmit the shooting parameters to another information processing device according to a user rating for a captured image that was imaged.

14. The information processing device according to claim 1, wherein the CPU is configured to:
transmit a request signal to another information processing device;
receive shooting parameters in response to the request signal; and
instruct an imaging unit to conduct imaging on the basis of the received shooting parameters.

15. A non-transitory computer readable storage medium, having stored thereon, a set of instructions for causing a computer to execute steps comprising:
storing shooting parameters;
detecting an instruction to change the shooting parameters; and
in response to the detected instruction to change the shooting parameters, changing the shooting parameters without relying on a surrounding environment,
wherein the detected instruction to change the shooting parameters does not indicate content of the change in the shooting parameters, but instructs execution of the change, and
wherein the set of instructions cause the computer to decide an amount of change of the shooting parameters according to a length of an operation time, a strength of an operation, or a direction of the operation in a change instruction operation by a user.

16. The information processing device according to claim 1, wherein the CPU is configured to change the shooting parameters according to a strength of a degree of shaking of the information processing device.

* * * * *